United States Patent Office 3,482,537
Patented Dec. 9, 1969

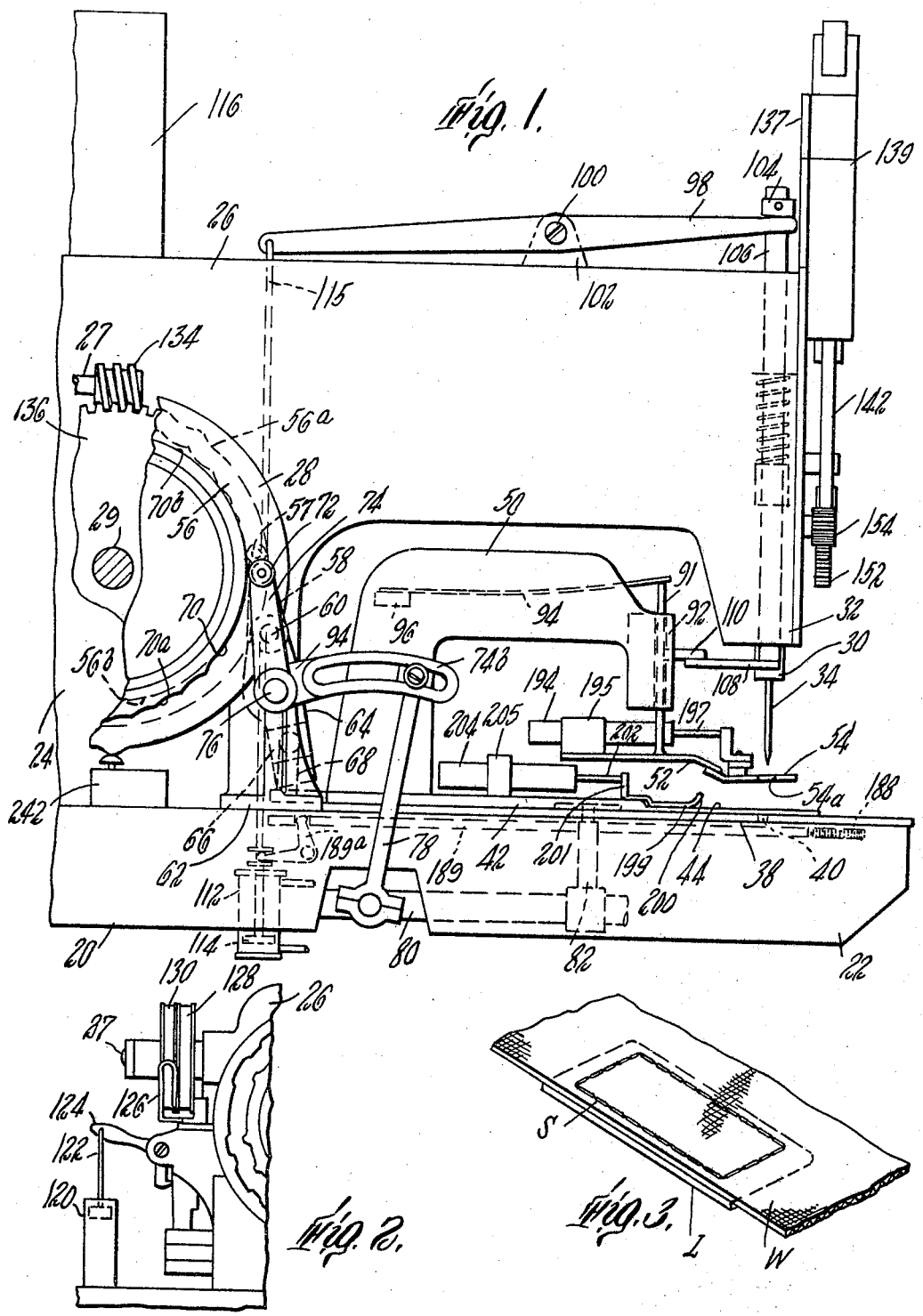

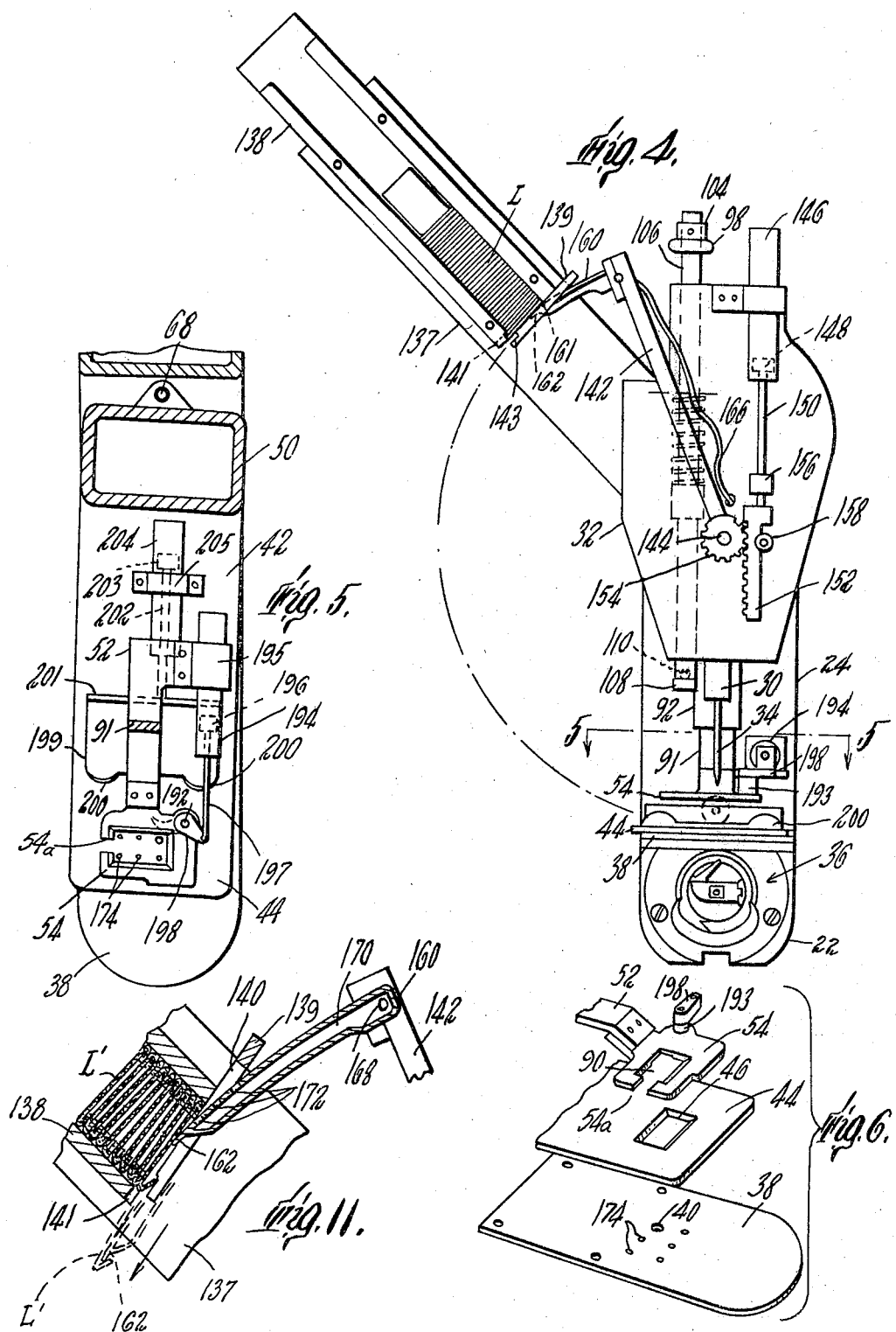

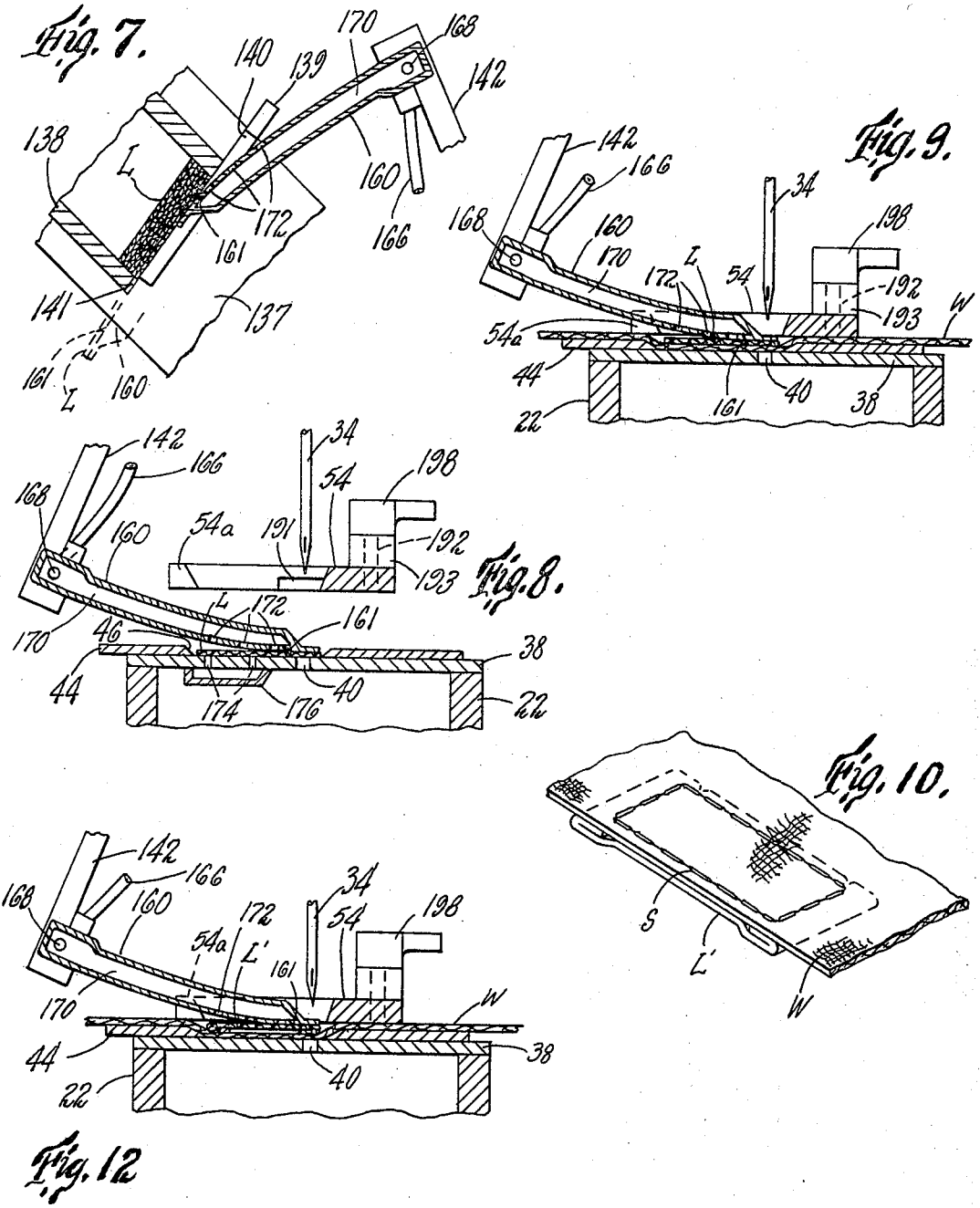

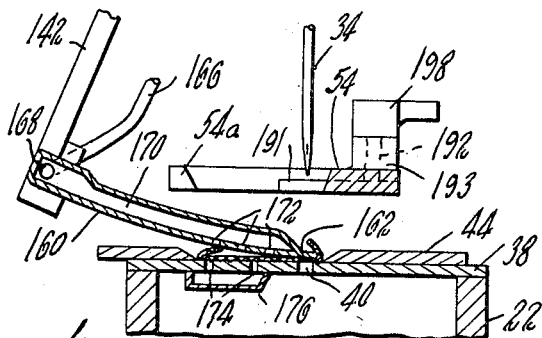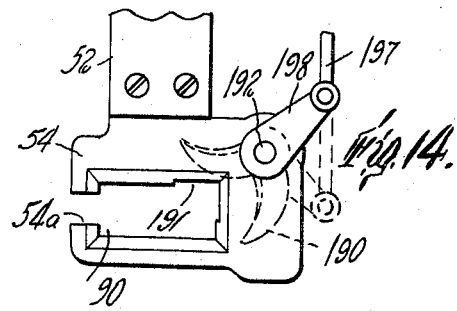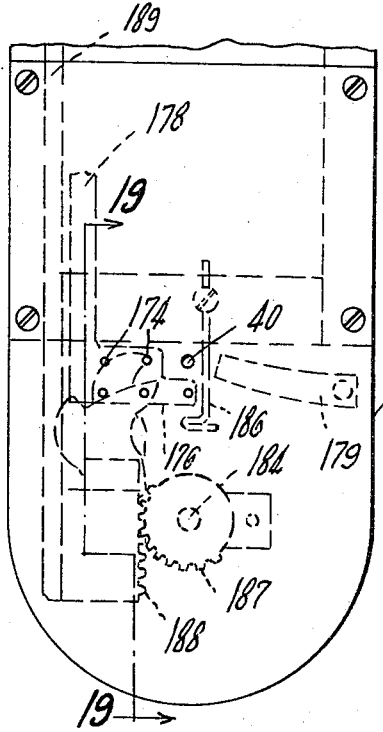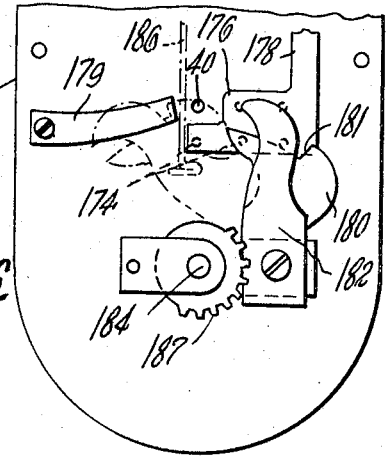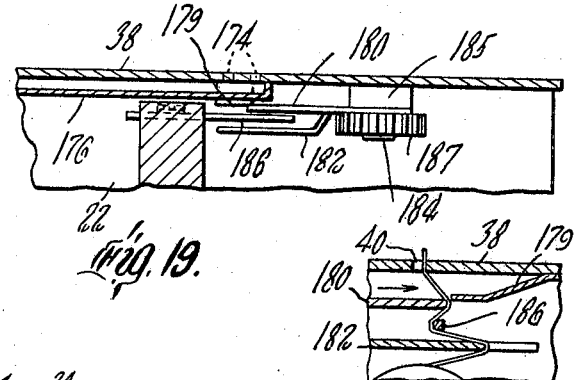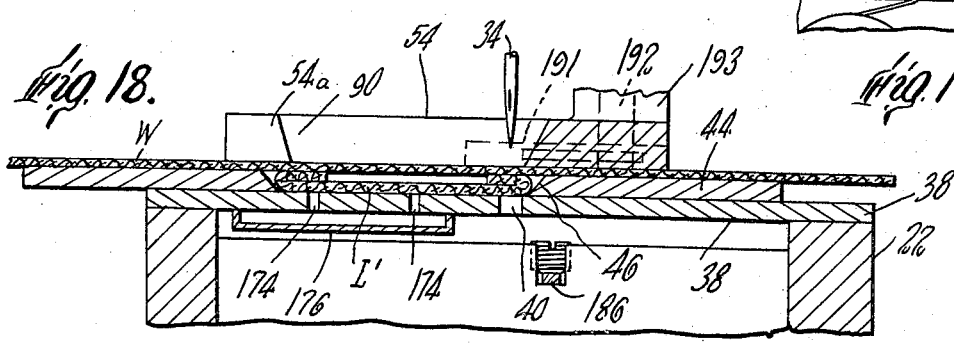

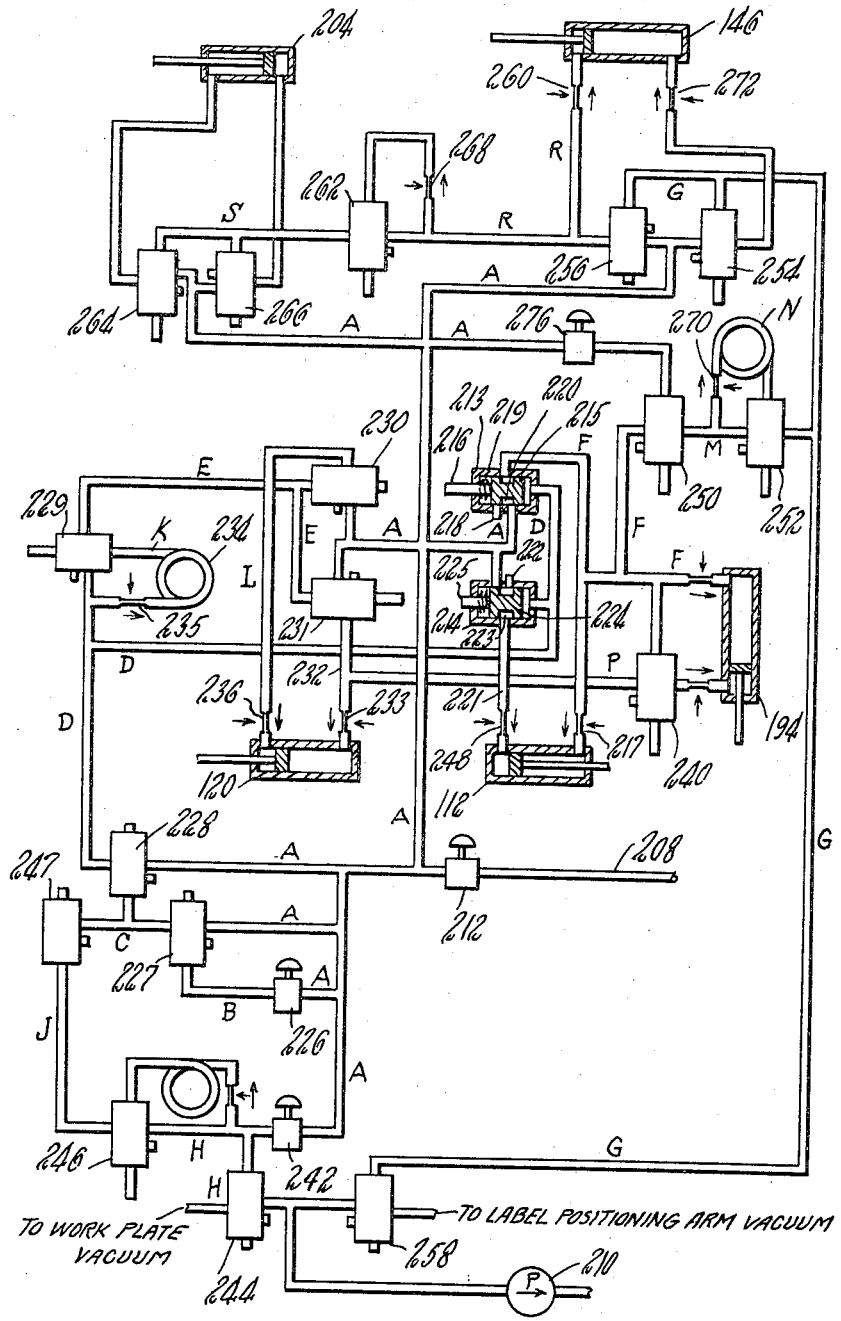

3,482,537
MACHINE FOR ATTACHING LABELS AND SIMILAR ARTICLES
Joseph F. Morin, Westwood, Mass., assignor to The William Carter Company, Needham Heights, Mass., a corporation of Massachusetts
Continuation-in-part of application Ser. No. 490,575, Sept. 27, 1965. This application Oct. 18, 1967, Ser. No. 676,256
Int. Cl. D05b 3/20, 3/22
U.S. Cl. 112—104                          13 Claims

ABSTRACT OF THE DISCLOSURE

A machine for attaching labels, patches, reinforcing swatches or similar articles, to a work piece has a work holding assembly at an attaching station for holding the articles in predetermined relation to a work piece. A magazine is provided for holding a supply of the articles in a laterally offset elevated position. A swinging feed arm frictionally engages and picks up articles, one at a time, from the magazine and supports them while they are being swung across an intervening, unobstructed vertical space surrounding the attaching station and deposits them at the attaching station either before a work piece is positioned thereover, or on top of a pre-positioned work piece, thus permitting the articles to be attached to upper portions of tubular articles inserted over the lower elements of the work holding assembly and the combined finished product to be removed while the feed arm is in a retracted portion of its cycle not obstructing the surrounding space. By swinging the feed element through an arc greater than 90°, the magazine can have a downward slope so that a stack of labels contained therein can be gravity fed to the feed arm which frictionally engages the exposed surface of the bottom-most article in the stack either on its exposed face or, if it is a flapped label, by passing underneath the flap, supplemented by suction to insure that the label does not fall off the feed element during the feed stroke.

When the article is delivered from the magazine and positioned at the attaching station prior to positioning a work piece thereover, suction is also provided to retain the delivered label in the fed position while the feed arm retracts, but a clamp at the work station is relied on to perform this function in those cases where it is preferred to have the work piece positioned first and then the label fed on top of the work piece.

Suitable automatic means is associated with the machine for securing a sequential operation of the feed arm, the suction devices, clamping of the work piece, attachment as by sewing, and automatic ejection.

---

This application is a continuation-in-part of my prior co-pending application Ser. No. 490,575 filed Sept. 27, 1965, now abandoned.

The present invention relates to a machine for fastening labels, patches, reinforcing swatches and similar articles to a work piece, and is particularly illustrated as embodied in a label sewing machine in which a label or similar articles is located in the machine in predetermined relation to a garment or other work piece for securing thereto.

It is a principal object of the invention to provide a novel and improved mechanism for supporting and feeding labels and similar articles of this general description to the work attaching assembly of the machine which will operate with a high degree of precision and accuracy to select and to transfer individual labels from the magazine to a predetermined label attaching position in the machine without unduly obstructing the space around the work attaching assembly.

It is a further object of the invention to provide a more efficient and completely automatic mechanism for use in a label sewing-machine for effecting the discharge of a sewn work piece, and the location of a new label in sewing position in the machine so that the operator is required only to place a new work piece in position and to trip the machine into operation to initiate each successive label attaching operation.

With these and other objects in view as may hereinafter appear, the several features of the invention will be readily understood from the following description taken in connection with the accompanying drawings in which:

FIG. 1 is a left side view of a portion of a conventional group stitching machine embodying the present invention;

FIG. 2 is a fragmentary view on a small scale illustrating portions of the driving and stop mechanism for the machine;

FIG. 3 is a detail view in perspective showing a portion of a work piece and one kind of label attached thereto;

FIG. 4 is a somewhat fragmentary view in front elevation of the group stitching machine of FIG. 1, the label feed arm being shown in its raised position;

FIG. 5 is a plan section taken on a line 5—5 of FIG. 4 illustrating the work plate, work support, clamp and upper thread cutter;

FIG. 6 is a fragmentary exploded view illustrating portions of the work plate, work support and clamp;

FIG. 7 is a detail sectional view on an enlarged scale of the magazine, stacked labels (of the kind used in FIG. 3) and feed arm as shown in FIG. 4;

FIG. 8 is a fragmentary view in front elevation similar to FIG. 4, but with the feed arm in its fully advanced position, and with portions of the feed arm and work supporting assembly broken away and sectioned;

FIG. 9 is a detail sectional view on an enlarged scale similar to that of FIG. 8 still using labels of the kind used in FIG. 3 but wherein a work piece has been positioned before, instead of after, delivery of the label;

FIG. 10 is a view similar to that of FIG. 3 showing a different kind of flapped label secured to a work piece;

FIG. 11 is a view similar to that of FIG. 7 showing a modification of the feed element to deal with stacked flap labels of the kind shown in FIG. 10;

FIGS. 12 and 13 are sectional views, similar to those of FIGS. 9 and 8 respectively, showing flapped labels of the kind appearing in FIG. 10, in position at the attaching station respectively after and before positioning a work piece;

FIG. 14 is a fragmentary plan view of the clamp foot and upper thread cutter;

FIG. 15 is a detail plan view of the work plate indicating in dotted lines portions of the under thread cutter mechanism and the work plate label holding section, this being the position taken during the sewing operation when the clamp is closed;

FIG. 16 is a bottom plan of the work plate and lower thread cutter mechanism of FIG. 15;

FIG. 17 is a detail sectional view in front elevation of the shuttle thread pull-off and severing mechanism in the thread pull-off and cutting position shown also in dot and dash lines in FIG. 16;

FIG. 18 is a section in front elevation still larger than that of FIG. 13, illustrating a work piece and flapped label clamped in position beneath the work piece for sewing;

FIG. 19 is a section in side elevation taken on a line 19—19 of FIG. 15; and

FIG. 20 is a diagrammatic view of the air operated control unit for the machine using flapped or plain labels which are to be delivered to the attaching station before positioning the work piece.

Referring more specifically to the drawings the invention is disclosed in a conventional cyclically operated group stitching machine for sewing labels onto garments and other work pieces. The machine is of the general type disclosed in United States patent of C. M. Horton, No. 1,051,998, Feb. 4, 1913, to which reference may be had for a more complete disclosure of the stitch-forming and start and stop mechanisms, the specific details of which form no part of the invention except as hereinafter more particularly pointed out. The mechanism for imparting work feeding movements to the work clamp assembly is comparable to that disclosed in the Horton patent except for the contours of the cam grooves which in the present case are selected to cause the stitch-forming mechanism to sew a seam of substantially rectangular pattern.

As shown in the drawings, the machine comprises a base 20 having a horizontal work-supporting arm 22 extending laterally therefrom, a standard 24 and an overhanging bracket-arm 26 supported by the standard. A rotary main shaft 27 is journaled lengthwise within the bracket-arm and is geared to turn a cam-wheel 28 on a cam shaft 29 as shown in said Horton patent. The machine is provided with stitch-forming mechanism including a reciprocating needle-bar 30 mounted in the head 32 of the bracket-arm and carrying an eye-pointed thread-carrying needle 34, and a cooperating oscillating shuttle mechanism 36 within the work-supporting arm 22. These elements are actuated from the main shaft by connections common to this type of sewing machine.

Secured upon the upper surface of the work supporting arm 22 at the forward end thereof, is a throat-plate 38 provided with a hole 40 for the passage of the needle. A bar 42 is slidingly mounted on the arm 22 and carries, at its forward end, a work-supporting plate 44 formed with a rectangular sewing opening 46 within which the substantially rectangular label-attaching seam is sewed.

Mounted on the bar 42 is a clamp frame 50 which carries at its forward end a work assembly feeding and holding means, including a clamp plate 52 having attached thereto a clamp foot 54 hereinafter more fully to be described.

The bar 42, frame 50 and the parts carried thereby are periodically shifted lengthwise of the arm 22 and crosswise thereof in a predetermined sequence to cause the stitch-forming mechanism to sew a seam S around the marginal portion of a rectangular label L to attach the label to a work piece W. As will be hereinafter described, the label may be an unfolded plain label as shown in FIG. 3, or a flapped label L' as shown in FIG. 10, and the label may be, at the time of sewing either beneath (FIG. 10) or above (FIG. 9) the work piece W. If it is a flapped label, its flaps will be inturned towards the work piece so the flaps will be up (FIGS. 13 and 18) if the work piece is on top of the label but will be down (FIG. 12) if the work piece is beneath the label.

For convenience, the operation will first be described as applied to flat unflapped labels as in FIG. 3 which are sewn to an overlying work piece (FIGS. 1–8, inclusive, 14–17, inclusive).

The means for giving the parts their movements lengthwise of the arm 22 comprise a cam groove 56 formed in that face of the cam-wheel 28 adjacent the standard 24, and arm 26. This cam groove is entered by a stud 57 carried by an arm 58 secured upon one end of a rock-shaft 60 journaled in the upper end of a bracket 62 secured upon the upper surface of the work-supporting arm 22. The other end of the rock-shaft 60 carries a depending arm 64 which, in turn, carries a block 66 slideable in a lengthwise track 67 in the arm 64. The block 66 is adjustably mounted on an upright pin 68 carried by the rear end of the bar 42. The cam groove 56 is formed with alternate stepped eccentric portions 56a and concentric portions 56b which portions act through the parts 58, 60, 62, 64, and 66 successively to shift the work assembly holding means including the bar 42, work support plate 44, clamp plate 52 and the work W held thereby step-by-step lengthwise of the arm 22 and then to hold it against endwise movement while it is shifted transversely of the arm about the axis of the pin 68 by means now to be described.

Transverse movement of the work-clamp is effected from a cam groove 70 formed in the outer face of the cam wheel 28. This cam groove is formed with alternate stepped eccentric portions 70a and concentric portions 70b. A stud 72 carried by the upper arm 74a of a bell-crank lever 74 tracks the cam groove 70 and oscillates the lever 74 about the axis of a fulcrum stud 76 by means of which the lever 74 is fulcrumed to a midportion of the bracket 62. The other arm 74b of the lever 74 is of arcuate form and has adjustably secured to it one end of a link 78 the other end of which is connected to an arm 81 carried by a rock-shaft 80 journaled in the arm 22. The shaft 80 is connected to the clamp bar 42 by an upwardly extending arm 82 and a longitudinally disposed cylindrical plug 83 slideably mounted in a recess in the clamp bar 42. The connections between the bell-crank lever 74 and the clamp bar 42 are shown more in detail in the above mentioned Horton Patent No. 1,051,998. Thus the cam groove 70 effects, through the elements 74, 78, 80, and 82, transverse movements of the work clamp about the axis of the pin 68. The cam grooves 56 and 70 are so related that the stepped eccentric portion of one is disposed adjacent the concentric portion of the other, causing the work assembly holding means including work support plate 44 and clamp plate 52 to be shifted selectively in lengthwise and transverse directions in a substantially rectangular pattern of movement. The work and the label carried by the work assembly holding means including the work support plate 44 and clamp plate 52 are so moved relative to the stitch-forming mechanism as to cause the sewing of a substantially rectangular seam as shown in FIG. 3.

A plain unfolded label designated at L in FIGS. 3 and 8 is supported in the aperture 46 of the movable work support 44 within which the stitching takes place against the stationary work plate 38. The assembled label L and an overlying work piece are held firmly together during the stitching operation by means of the foot 54 (FIG. 6) which takes the form of a plate having formed therein a rectangular aperture 90 which overlies the aperture 46 in the work support 44. The sides of both apertures are sloped outwardly in an upward direction and the aperture 90 in the foot 54 is made slightly shorter at the two ends than the underlying aperture 46 providing a narrow overlap by means of which some vertical positioning pressure is exerted through the work piece against the two ends of the label L. With this arrangement, the line of stitching can be placed close to the edge of the label around all four sides thereof. The movement of the clamp foot 54 towards the work support 44 causes a work piece to be firmly held in a stretched out condition against the work support 44 over a substantial area and against the underlying label L which is further held at each end by the slightly overlapping press of the clamp foot 54 against the end portions of the label.

The clamp plate 52 is shown (see FIG. 6) as a flat horizontally disposed member secured to the lower end of a vertical slide 91 carried in a guideway 92 formed in the forward end of the clamp frame 50 (see FIGS. 1, 5 and 6). The clamp plate 52 and foot 54 attached thereto are pressed downwardly into clamping position by means of a torsion spring 94 at one end attached to a bracket 96 on the clamp frame 50 and at its other end engaged against the upper end of the slide 91.

When the machine is brought to a stop position, in accordance with the automatic cycle of operations hereinafter described, the clamp member 52 and foot 54 are raised against the pressure of the spring 94 by the operation of a horizontally disposed clamp release lever 98 fulcrumed at 100 on a bracket 102 secured upon the over arm 26. The forward end of the lever 98 engages beneath a collar 104, secured upon a vertically disposed spring depressed bar 106 carried in the forward end of over-arm 26. A transverse plate 108 attached to the lower end of the bar 106 underlies a pin 110 secured to the slide 91, and acts when the bar 106 is raised to lift the clamp foot 54 to the release position of FIG. 1.

The clamp release lever 98 is connected with an air actuated clamp release cylinder 112 and plunger 114 by means of a rod 115. The operation of the clamp release cylinder is controlled from an air actuated control unit 116 hereinafter described in connection with the diagrammatic FIG. 20.

The machine is provided with a conventional start and stop mechanism similar to that illustrated in the Horton Patent No. 1,051,998 above referred to which operates when actuated to start the machine, causing the stitching operation to be transferred about the label following a rectangular path, and at the end of the operation to stop the machine. In the present construction, the starting of the machine is effected by an air actuated start cylinder 120, see FIGS. 2 and 20, which is connected by a link 122 with the usual control lever 124 which operates through suitable connections set forth in said Horton patent to operate a belt shifter 126 associated with a fast pulley 128 and a loose pulley 130 on the drive shaft 27 connected by worm 134 and gear 136 with the cam shaft 29. The operation of the starting cylinder is controlled from the air actuated control unit 116, FIG. 20.

In the illustrated machine, a novel and improved mechanism is provided for feeding a label automatically into position in the label positioning recess 46 in the work supporting plate 44 for each successive label sewing operation.

The labels L are supported facing downwardly in a magazine 138 mounted on a bracket 137 on the sewing head 32 of the machine bracket over-arm 26. The magazine is thus laterally offset from and elevated above the path of the sewing needle 34. The magazine 138 consists of a rectangular enclosure within which the labels are stacked, the bottom label of the stack resting on an end support or plate 139 which is slotted at 140 to receive the leading edge of the feed arm hereinafter described, with adjacent side rails and being cut away at 141 to provide clearance for the feed arm and label engaged thereby when drawn endwise from the magazine. A weight inserted at the upper end of the magazine biases the stack downwardly so that the bottom label is firmly held in position against the end plate 139.

The label is transferred from the magazine 138 to the sewing position in the machine preparatory for the performance of a next succeeding sewing operation by means of a label transfer feed arm 142 supported to turn on a pivot 144 on the sewing head 32 from a raised label pickup position as shown in FIG. 7 counterclockwise through an arc exceeding 90° to the fully advanced label feed position of FIG. 8. As shown in FIG. 4, this leaves the side of the sewing head unobstructed when the feed arm 142 is in retracted position so that tubular work pieces may be readily inserted into sewing position over the plate 38 and superposed work support 44. The label feed traverse this free unobstructed vertical space either before or after the work piece is inserted—but is never there when the work piece is being inserted or when the finished product is being ejected either by hand or mechanically. The feed arm 142 is actuated by means of an air actuated cylinder 146 and piston 148 which is connected by a piston rod 150 and a rack 152 with a pinion 154 attached to the hub of the label feed arm 142. A guide roll 158 provides a backing support for the rack 152. The feed arm actuating cylinder 146 is controlled from the air actuated control unit 116 hereinafter described in connection with the diagrammatic FIG. 20.

The label feed arm 142 carries an arcuately curved lateral extension 160 fitted and secured into a socket formed in the arm 142. On its outer face, it has a pair of tiny pins 161 extending outwardly and inclined in the diretcion of downward motion. These pins are adapted for movement along an arcuate path which passes through the slot 140 in the bottom end of the magazine 138 and thence outwardly through the cut-away portion 141. The movement of the label feed arm 142 from the normally retracted position of FIG. 7 forces the pins 161 into the bottom label in the magazine causing the label to be withdrawn lengthwise from the bottom of the stack. The pins 161 pass beneath the cut-out 141 in the adjacent side wall by a very narrow margin which is sufficient only to allow the engaged label to be withdrawn while the next adjacent label is held firmly in position against movement with the feed arm.

The label feed arm 142 continues to move downwardly to a precisely determined advanced position as shown in FIG. 8, in which the label is accurately positioned within the recess 46 in the work-supporting plate 44 and against the exposed surface of the work plate 38. It will be noted that the lateral arcuate feed arm extension 160 is projected outwardly along its length from the rotational axis of the feed arm 142 in order to facilitate this operation.

In the operation just described, an air suction is provided along the outer face of the lateral extension 160 of the feed arm in order to position and to hold the label thereon, and a second air suction is provided in the work plate 38 which operates to draw the label down firmly against the work plate 38 within the recess 46 of the work support 44, and to maintain the label in said position as the feed arm 142 is withdrawn and during the manual positioning and clamping of a work piece in overlying position on the work-supporting member 44. The air suction provided on the outer face of the feed arm extension 160 through connections from the air operated control unit 116 of the machine is hereinafter more fully described in connection with the diagrammatic FIG. 20. These connections include a suction line 166 connected by a port 168 with a chamber 170 which is formed within the feed arm extension 160 and which is connected by air ports 172 with the outer surface of said feed arm extension 160. The air suction in the work plate 38 is provided by connections from said air operated control unit 116, which include a series of air vents 174 in the work plate 38 which open into a suction box 176 formed on the underside of the work plate and an air suction conduit 178 to the air actuated control unit 116.

Upper and lower thread cutting devices are provided for cutting both the needle and shuttle threads upon completion of a sewing operation. As shown in FIGS. 15, 16, 17 and 19, the lower thread cutter comprises a fixed anvil member 179 which is secured to the under side of the work plate 38 and cooperates with a transversely movable shuttle thread pull-off and severing assembly consisting of a flat cutter plate 180 having a cutting edge 181, and a thread pull-off element 182, said parts being rotatably mounted on a pivot pin 184 rotatable in a boss 185 secured to the under side of the work plate 38. A relatively stationary guide 186 is interposed between the cutter plate 180 and the lower thread pull-off element 182. Rotation of the pivot pin 184 causes the thread pull-off element 182 to draw the thread laterally against the guide 186 forming a bight between the shuttle and guide 186. That portion of the thread extending from the guide 186 to the needle aperture 40 in the work plate is engaged by the hooked extension of the cutter plate 180 and is guided against the knife edge 181 which moves into shearing engagement with the anvil member 179 to sever the thread closely adjacent the work. The shuttle thread pull-off element 182 and cutter plate 180 comprise an integral operating unit to which is imparted a simple forward and return movement to effect the drawing off from the shuttle of a measured amount of thread, and the severing of the thread adjacent the work, followed by the return of the unit to its initial inoperative position. The length of the thread pulled off from the shuttle is adjusted to provide a very short length of thread extending from the work at the beginning of the sewing operation, thus reducing losses of thread at this point in the sewing operation to a minimum.

The operating connections for the cutter include a pinion 187 secured to the pivot pin 184 which is engaged by a rack 188 carried on the forward end of a sliding bar 189 which is in turn connected by a bell crank lever 189a with the piston rod 115 for the clamp cylinder 112. The shuttle thread measuring and severing device is adapted to be operated by the connections above described simultaneously with the unclamping of the sewn work piece. The needle thread is arranged to be cut immediately above the level of the work by means of a thread cutter 190 which is supported for movement in a plane parallel to the surface of the work piece in a shallow aperture 191 formed in the underside of the clamp foot 54 (see FIGS. 5, 6, 8 and 14). The cutter 190 is secured to the lower end of a pivot pin 192 rotatably mounted in a boss 193 on the clamp foot 54. The thread cutter 190 is actuated by means of compressed air cylinder 194 carried on a bracket 195 mounted on a rearward extension of the clamp plate 52. The cylinder piston 196 is connected by a piston rod 197 with an arm 198 secured to the upper end of the cutter supporting pivot pin 192. The compressed air connections to the cylinders 194 and the control valves by means of which the cylinder is operated when the clamp is raised to release the work piece are particularly shown and will be described in connection with FIG. 20 illustrating the several air operated controls for the machine.

With the present construction, mechanism is provided for automatically ejecting the finished work piece from the machine upon completion of the sewing operation. The ejector mechanism, as best shown in FIGS. 1 and 5, comprises an ejector plate 199 formed with an upwardly sloping forward edge 200 for engagement with the work piece, and a vertically extending flange 201 along the rear side of the plate which is connected by a piston rod 202 with a piston 203 and a compressed air cylinder 204 supported by a bracket 205 on the bar 42. The air cylinder 204 is connected by means of suitable air conduits with control valves forming part of the air operated control unit 116, hereinafter to be described.

For these operations, the illustrated label sewing machine is constructed and arranged to operate in accordance with an automatic cycle in which a label is already positioned. The operator is required only to place a work piece in position over the label and thereafter to start the machine in operation. This operation will be briefly described in connection with the air actuated control unit 116 illustrated in the diagrammatic FIG. 20. Elements of my automatic label attaching control system as shown in FIG. 20 include the five air actuated cylinders above described comprising the clamp release cylinder 112, the start cylinder 120, the feed arm actuating cylinder 146, the upper thread actuating cylinder 194 and the work ejector cylinder 204, and also the two air suction devices in the feed arm extension 160 and work plate 38. The air actuated control unit 116 includes an air supply line 208, and a vacuum pump 210. Air under pressure is admitted through a palm button valve 212 to a primary air supply line A, and through certain other control valves as hereinafter noted to secondary lines F and M for controlling the several air cylinders above noted.

All of the above mechanism is equally useful for flapped labels L' though in the case of flapped labels which are to be delivered with the flaps up, as shown in FIGS. 11, 13 and 18, it is preferred to omit the pins 161 on the feed element and rely on the thin leading edge 162 of the extension 160 of the feed arm 142 passing into the crease formed by the turned over tab of the bottom label in the magazine to withdraw the bottom label from the magazine, the cut-out 141 being such as to allow as before only the bottom label to be withdrawn. For this purpose the plate 139 may be cut away at 143 to allow the flap to bend downwardly.

The several operating valves for the air cylinders and air suctions together with the connections thereto will be pointed out in connection with the following description of the operation. Since the several control valves employed are identical in construction, only the two control valves 213 and 214 associated with the clamp cylinder 112 have been fully illustrated. The control valve 213 comprises a casing in which is mounted an axially shiftable valve member 215, which is normally open as indicated by the relatively long stem 216 extending from the left hand end of the valve. The valve has an inlet port connected with supply line A, an outlet port connected with the secondary supply line F leading to adjustable restriction 217 and the clamp cylinder 112, and exhaust port 218, and a valve shift pressure inlet port connected with a valve control pressure line D. A spring 219 maintains the valve member 215 in a retracted position to the right in which a land 220 in the valve member 215 connects the pressure inlet line A directly with the supply line F, while the exhaust port 218 is blocked off. When pressure is supplied through the control pressure line D the valve member 215 is moved to a closed position shutting off supply line A and connecting secondary supply line F with exhaust.

The control valve 214 is similar to the valve 213 above described having ports connecting respectively with pressure supply line A, with a secondary supply line 221 leading to the other end of clamp cylinder 112, with exhaust at 222, and with the control pressure line D. These ports are arranged with relation to a land 223 in the valve member 224 for the normal retracted position of the valve to shut off the supply line A and to connect the supply line 221 to the cylinder directly to exhaust. With the arrangement shown valve 213 is normally open and is distinguished by the relatively long stem 216, whereas the valve 214 is normally closed, and is distinguished by a relatively short stem 225. Since all of those valves illustrated in FIG. 20 with long stems are normally open valves identically similar to the valve 213, and all of those valves shown with short stems are normally closed valves identically similar to the valve 214, no further detailed description of these valves is believed necessary.

The operating cycle of the machine hereinafter described is that which is used when the label is delivered to the attaching station before the work piece to which it is to be attached as in FIGS. 8 and 13. The cycle begins with the placing of a work piece in the machine and the starting of the machine by the operator, and ends with the ejection of the completed work piece from the machine, and the positioning of a new label in sewing position after the machine has stopped.

The operator presses the palm button valve 212 (FIG. 20) pressurizing lines A, F and M so that the pistons of the start cylinder 120, knife cylinder 194, and label cylinder 146 are extended and the pistons of the clamp cylinder 112 and eject cylinder 204 are retracted. The machine is now ready to start.

The operator presses a start valve 226, causing the piston of clamp cylinder 112 (see FIG. 1) to extend actuating the clamp foot 54 to clamp the work piece and underlying label in the desired relative positions on the removable work support 44, and returning the shuttle thread pull-off and cutter unit to a reset operating position. The piston of the starting cylinder 120 (see FIG. 2) retracts thereby energizing the machine clutch, and thereafter, returns to its initial extended position. These operations are performed in the following manner.

The actuation of start valve 226 causes a line B to be momentarily pressurized opening a normally closed valve 227. Line C is pressurized opening a normally closed momentary impulse valve 228. Lines D are pressurized opening normally closed valve 214 and closing normally open valve 213 exhausting lines F, so that the piston of clamp cylinder 112 extends, controlled by flow control restriction 217. Simultaneously lines E are pressurized through a normally open valve 229 opening a normally closed actuating valve 230 supplying air pressure from line A through line L to the start cylinder 120 and closing normally open actuating valve 231 thus connecting supply line 232 for said cylinder to exhaust so that the piston of start cylinder 120 retracts controlled by a flow control restriction 233. At the same time line K containing a time delay device exemplified by a coil 234 is pressurized at a rate controlled by a flow control restriction 235. When sufficient pressure accumulates in line K, normally open valve 229 closes, exhausting line E. The piston of start cylinder 120 extends controlled by a flow control restriction 236 in line L. Line P connected with supply line 232 is pressurized and acts through a normally open control valve 240 to retract the piston of knife cylinder 194.

At the end of the sewing operation, that is, when the work support returns to its initial position, and rotation of the cam shaft 29 is arrested by the operation of the machine stop motion an abutment on cam ring 28 actuates a button valve 242 initiating the following series of operations:

A suction is set up in the work plate suction duct 178. The piston of clamp cylinder 112 is retracted thereby releasing and raising the work clamp foot 54. The ram of the knife cylinder 194 extends causing the upper thread cutting knife 190 to sever the thread (see FIG. 14). The operation clamp cylinder 112 is effective also through the mechanical connections above described to operate the shuttle thread pull-off and severing assembly. The thread pull-off arm 182 and cutter plate 180 move forward to the position shown in dot and dash lines in FIG. 16 and in full lines in FIG. 17 to pull off a bight of thread from the shuttle and to sever the shuttle thread from the work, and thereafter to return to the initial full line position of FIG. 16 and as shown in dotted lines in FIG. 15.

At the same time that the above operations are taking place, the piston of the label feed cylinder 146 is retracted, moving the label positioning arm downwardly in the feed direction, and a vacuum is set up in the label positioning arm suction ducts 172 (see FIG. 8) to engage and hold a label from the magazine 138 in contact therewith.

The piston of the work piece ejector cylinder 204 is extended causing the completed work piece to be ejected from the machine. During the advance of the ejector plate 199 by ejector cylinder 104 the upwardly bent tabs 200 at the two sides of the ejector plate engage and hold the work piece W and label downwardly against the work plate 44, while the straight intervening edge of the ejector plate, scraping against the top face of the work plate 44, is held firmly against the edge of the work piece W and attached label to push the finished work away from the operating zone of the sewing machanism.

Thereafter the pistons of each of the knife actuating cylinder 194, the work piece ejector cylinder 204 and the label positioning arm cylinder 146 are returned to their initial positions and the suction provided by the suction pump 210 to each of the work plate 38 and the label positioning arm extension 160 is shut off. These operations are performed in the following manner:

The opening of the button valve 242 (see FIGS. 1 and 20) pressurizes lines H. Normally closed vacuum valve 244 opens creating a work plate suction. Line J is pressurized through normally open valve 246, opening normally closed valve 247 exhausting line C. Momentary impulse valve 228 closes exhausting lines D and K. Valve 214 closes. Valves 229 and 213 open. Lines F are pressurized retracting the piston of clamp cylinder 112 at a rate controlled by flow control restriction 248 in connecting line 221. Valve 240 closes causing the piston of knife cylinder 194 to extend so that the upper thread cutter 190 is moved to the rearward dotted line position (FIG. 5).

At the same time line G is pressurized through normally open valves 250 and 252 closing normally open valve 254 and opening normally closed valves 256 and 258 to apply a label positioning arm vacuum.

Line R is pressurized retracting the piston of label positioning arm cylinder 146 at a rate controlled by flow control valve 260.

Simultaneously line S is pressurized through normally open valve 262 closing valve 264 and opening valve 266 thereby extending the piston of ejector cylinder 204 to eject the completed work piece from the machine.

At the same time air passes from line R through flow control valve 268 closing valve 262, thereby reversing the preceding action starting with line S to again retract the piston of ejector cylinder 204.

By this time pressure from line M has built up in the time delay coil N through flow control 270 closing valve 252, exhausting lines G.

Valve 254 opens and valves 256 and 258 close, lines R are exhausted, the piston of label positioning arm cylinder 146 extends at a rate controlled by flow control 272, thereby returning the label positioning arm 142 to the raised position of FIG. 4.

Push button valve 276 is provided for independent cycling of the label positioning arm cylinder 146 and the ejector cylinder 204.

If, for some reason, it is preferred to sew the label down on top of the work piece, instead of sewing the work piece down on top of the pre-positioned label, the operating mechanism can be readily rescheduled so that the clamp foot 54 is utilized to clamp the delivered label before the feed arm 142 starts its retracting movement. Such a modification of the timing of the clamping motion of the clamp foot 54 is necessary when the work piece is on the bottom because the suction provided by the air vents 174 in the work plate 38 are not effective in holding the label from being retracted with the feed arm when the work piece intervenes. In order to permit the clamp 54 to be lowered while the feed arm extends beneath it, the clamp foot 54 is provided with a suitable slot 54a (FIG. 1) sufficient in width to accommodate the width of the feed arm and so the feed arm can be retracted after the clamp has been lowered. This operation with respect to an unflapped label is shown in FIG. 9 with the work piece W being positioned underneath the label L.

Where flapped labels are to be fed on top of a pre-positioned work piece, it will be seen that the flapped labels will have to be mounted in the magazine with their flaps inmost rather than outermost so that they will be delivered, as shown in FIG. 12, with the flaps turned downwardly and against the work piece W. For this reason it is necessary to use the pinned feed arm that is used with the plain label L for this operation, rather than the unpinned arm which uses its leading edge to engage the flaps as in the operation shown in FIGS. 11 and 13. Also as shown in FIG. 12 when a flapped label L' is delivered on top of a pre-positioned work piece, again the slot 54a must be present in order to permit the clamp to be lowered while the feed arm is at its most advanced delivery position rather than have the feed arm 142 retract before the clamp foot 54 is lowered as in the operation as shown in FIGS. 8, 13 and 18. Hence the suction box 176 shown in FIGS. 8, 13 and 18 is omitted in FIGS. 9 and 12.

The invention having been described what is claimed is:

1. In a machine for attaching labels and similar articles to a work piece; an attaching station; a work holding assembly at said attaching station for supporting in predetermined generally horizontally extending relationship a work piece and an article to be attached thereto;

a magazine laterally offset from said station for holding a stack of articles to be attached with the central face of the outermost article in said stack exposed;

a feed element pivotally mounted on said machine for swinging movement to and fro from an article pick-up position engaging the exposed face of the outermost article in said magazine through a path extending across an unobstructed vertical space beside said station to said station; and means on said feed element for supporting an article, picked up by said feed element at said pick-up position, as said element moves through said path from said pick-up position to said station; and means for releasing the article from said feed element at said station in a generally horizontal position with its previously exposed face up.

2. In a machine for attaching labels and similar articles to a work piece; an attaching station; a work holding assembly at said attaching station for supporting in predetermined generally horizontally extending relationship a work piece and an article to be attached thereto;

a downward inclined magazine laterally offset from, elevated above and facing said station for holding a stack of articles to be attached with the central bottom face of the lowermost article in said stack exposed;

a feed element pivotally mounted on said machine for swinging movement to and fro from an article pick-up position engaging the exposed face of the lowermost article in said magazine through a path extending through an arc greater than 90° to said station; and means on said feed element for supporting an article, picked up by said feed element at said pick-up position, as said article is inverted at least partially by the motion of said element through said path to said station; and means for releasing the article from said feed element at said station in a generally horizontal position with its previously exposed face up.

3. A machine as claimed in claim 2, wherein the means for supporting said article on said feed element includes means providing for air suction through said feed element and the means for releasing said article at said station comprises means beneath said delivered article providing an air suction for holding said article down on said work holding assembly at said station while said feed element moves away from said station.

4. A machine as claimed in claim 2, wherein the feed element delivers said article at said station on top of a prepositioned work piece, and said releasing means includes a work clamp movable into a position clamping said article down onto said work piece before said feed element moves away from said station.

5. In a machine for attaching labels and similar articles with folded-over end tabs to a work piece; an attaching station; and a work holding assembly for supporting in predetermined relation a work piece and an article to be attached thereto, mechanism for supporting and feeding articles successively to said work holding assembly, which comprises a magazine mounting a stack of labels having bent-over end tabs, a label feed element having a thin pick-up edge arranged for engagement within an exposed folded-over end tab of the outermost label in said stack, and end plate at the discharge end of said magazine, said end plate having formed therein a longitudinal slot to receive said pick-up edge and adjacent side rails with a portion underlying the bent-over tab of the supported label cut away to permit a partial opening of said tab, and said magazine having a side plate abutting the leaving end of said discharge end recessed to provide clearance for the discharge of the engaged label while retaining the remaining labels in the stack, and supporting means on which said label feed element is movable from a label pick-up position to engage said pick-up edge within the folded-over end tab of a label positioned on said label support, to a label delivery position in which said pick-up edge and label supported thereon are located with relation to said work holding assembly.

6. A machine according to claim 5 in which the label feed element is a pivoted feed arm having a laterally offset extension with a thin pick-up edge accurately movable within said slotted bottom plate to engage within said folded-over end tab and to withdraw the label longitudinally from the magazine.

7. In a machine for attaching labels and similar articles with folded-over end tabs to a work piece, the combination of a work plate, a work support overlying said work plate having an aperture shaped to receive in edge abutting relation a label laid out on said work plate, said work support comprising a plate arranged to receive thereon a work piece in stretched out position overlying and confining a said label within said work support aperture, means for attaching together a confined label and superimposed work piece, and mechanism for feeding labels successively into position on said work plate within said work support aperture for attachment to a superimposed work piece which comprises a magazine having a discharge face and mounting a stack of labels having the bent-over end tabs facing said discharge face, a label feed arm pivoted on said machine having a laterally offset extension with a thin pick-up edge movable to engage within the folded-over end tab of a label to withdraw from said stack and to position said label in said aperture, suction means in said laterally off-set extension for adhering the engaged label thereto, and suction means in said work plate for drawing a said label down into the work support aperture against said work plate.

8. A machine for attaching labels and similar articles with folded-over end tabs to a work piece having a label feeding mechanism according to claim 7, in which mechanism is provided for effecting the automatic feeding of a said article, which comprises mechanism acting when rendered operative to effect a forward rocking feed movement and a rocking return movement to said label feed arm, means acting in timed relation to the feed movement of said arm to apply said feed arm suction, and means acting upon the completion of said feed movement of said feed arm to shut off said label feed arm suction, and to apply said work plate suction means to draw a said article into said aperture against the work plate.

9. In a label sewing machine for sewing a label having folded-over end tabs to a superimposed work piece, the combination of a stitch forming mechanism including a reciprocating needle, a work plate apertured to receive the needle, a clamp assembly including a work support movable on said work plate relative to said stitch forming mechanism and having formed therein an aperture shaped to receive in edge abutting relation a label laid out on said work plate to be slid with said work support about the work plate, a work clamp on said work support operable to clamp a work piece to said work support overlying said aperture and label located therein, a label supply mechanism comprising a holder in which a label is positioned with a folded-over end tab thereof exposed, a label feed element having a thin pick-up edge arranged for engagement within the folded-over end tab of a said label, and supporting means on which said label feed element is movable along a label transfer path from a label pick-up position to engage said pick-up edge within the folded-over end tab of a label positioned on said label support and to transfer said label endwise along said path to a label delivery position in which said pick-up edge and label supported thereon are located in said work support aperture.

10. A label sewing machine having a label supply mechanism according to claim 9, in which the label holder is a magazine having an end support mounting a stack of labels having the bent-over end tabs facing said end support, said end support being apertured to receive said pick-up edge moving along said label transfer path, said magazine comprising additionally a side support disposed adjacent said label transfer path to permit withdrawal of a label engaged by said pick-up edge longitudinally from the magazine while holding the remaining labels of said stack.

11. A label sewing machine having a label supply mechanism according to claim 10, in which said end support is generally U-shaped providing side rails for supporting the label along the edges thereof, said side rails being further recessed to leave a leading folded-over end of the bottom label partially open to be engaged by said pick-up edge.

12. In a label sewing machine for sewing a label having folded-over end tabs to a superimposed work piece, the combination of a stitch forming mechanism including a reciprocating needle, a work plate apertured to receive the needle, a clamp assembly including a work support movable on said work plate relative to said stitch forming mechanism and having formed therein an aperture shaped to receive in edge abutting relation a label laid out on said work plate to be slid with said work support about the work plate, a work clamp on said work support operable to clamp a work piece to said work support overlying said aperture and label located therein, a label supply mechanism comprising a holder in which a label is positioned with a folded-over end tab thereof exposed, a label feed element having a thin pick-up edge and an adjacent label holding surface arranged for engagement within the folded-over end tab of a said label, supporting means on which said label feed element is movable along a label transfer path from a label pick-up position to engage said pick-up within the folded-over end tab of a label positioned on said label support and to transfer said label endwise along said path to a label delivery position in which said pick-up edge and label supported thereon are located in said work support aperture, suction means within said label feed element for applying a label holding suction through said label holding surface, suction means in said work plate for drawing said label down into the work support aperture against said work plate, and control means for applying said feed arm suction during movement of the said element from the label delivery position, and for applying said work plate suction to receive and to position said label.

13. A label sewing machine for sewing labels having folded-over end tabs to a superimposed work piece having in combination stitch forming mechanism including a shuttle and a reciprocating needle and an intervening work plate apertured to receive the needle, and a work supporting and clamping assembly comprising a work support movable on said work plate relative to said stitch forming mechanism having formed therein an aperture in which a label is located to be slid with the work support about the work plate, a clamp foot having an aperture of substantially the same size and shape overlying said work support aperture and having adjacent clamping surfaces surrounding said aperture for clamping a work piece to said work support in a stretched out position overlying and confining a said label within said work support aperture, thread severing devices including a needle thread severing knife on said clamp foot, and a shuttle thread pull-off and severing mechanism between the shuttle and work plate, a work piece ejector device comprising an ejector plate mounted on said work support for movement outwardly along said work support across the line of movement of the needle, a label supply mechanism comprising a holder in which a label is positioned, a label feed element having a thin pick-up edge arranged for engagement within the folded-over end tab of said label shiftable from a label pick-up position adjacent said holder to a label discharge position adjacent said work support aperture, means providing a label pick-up air suction in said feed element and means providing an air suction through said work plate for drawing said label into said aperture against said work plate, and a pneumatic control system comprising a machine start cylinder, a clamp cylinder, a needle thread knife cylinder, a work piece ejector cylinder, and label feed element cylinder, a label pick-up suction control valve, a work plate suction control valve, compressed air operating lines connected with each of said cylinders and air suction control valves, a manual start control valve operative to supply compressed air through said lines and said cylinders to engage the clamp foot and start the machine, and a stop control valve operative to supply compressed air through said lines and cylinders to open said clamp foot, sever the threads, eject the sewn work piece, shift said feed element to and from said label discharge position, to energize said label pick-up suction during the advance of said feed element, and to energize said work plate suction while said clamp foot is raised.

References Cited

UNITED STATES PATENTS

| | | | |
|---|---|---|---|
| 1,051,998 | 2/1913 | Horton | 112—252 |
| 1,147,375 | 7/1915 | Coffman | 221—240 X |
| 1,657,364 | 1/1928 | Bartlett | 221—240 |
| 2,109,208 | 2/1938 | Crighton | 271—44 |
| 2,313,433 | 3/1943 | Golden | 112—104 |
| 2,548,692 | 4/1951 | Vollman et al. | 112—104 |
| 2,560,186 | 7/1951 | Plopper | 112—113 |
| 2,988,245 | 6/1961 | Mannhardt | 221—42 |
| 3,377,972 | 4/1968 | Cohen et al. | 112—104 |

FOREIGN PATENTS 115,211 3/1899 Germany.

MERVIN STEIN, Primary Examiner

G. V. LARKIN, Assistant Examiner